United States Patent
Kolomeitsev

(10) Patent No.: US 6,744,171 B1
(45) Date of Patent: Jun. 1, 2004

(54) ROTATING ELECTRIC MACHINE WITH SLOPED TOOTH SURFACES FOR COGGING TORQUE REDUCTION

(75) Inventor: Sergei F. Kolomeitsev, Rochester, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 09/974,080

(22) Filed: Oct. 9, 2001

(51) Int. Cl.[7] .............................. H02K 1/14; H02K 1/06; H02K 1/08; H02K 1/12
(52) U.S. Cl. ........................................ 310/254; 310/216
(58) Field of Search .................................. 310/218, 254, 310/67 R, 216

(56) References Cited

U.S. PATENT DOCUMENTS

| | | | |
|---|---|---|---|
| 2,479,329 A | * 8/1949 | Ellis | 310/216 |
| 2,627,040 A | * 1/1953 | Hanse | 310/49 R |
| 3,860,843 A | 1/1975 | Kawasaki | |
| 4,516,048 A | * 5/1985 | Brigham | 310/156.64 |
| 4,748,362 A | * 5/1988 | Hedlund | 310/162 |
| 4,874,975 A | * 10/1989 | Hertrich | 310/156.12 |
| 5,032,749 A | * 7/1991 | Stone | 310/254 |
| 5,086,245 A | * 2/1992 | Sieja et al. | 310/216 |
| 5,260,620 A | * 11/1993 | Morrill | 310/166 |
| 5,265,323 A | 11/1993 | Odell | 29/596 |
| 5,331,245 A | * 7/1994 | Burgbacher et al. | 310/186 |
| 5,644,181 A | 7/1997 | Kooken et al. | 310/216 |
| 5,670,836 A | * 9/1997 | Horst | 310/156.15 |
| 5,719,456 A | * 2/1998 | Kolomeitsev | 310/112 |
| RE35,763 E | 4/1998 | Burgbacher | |
| 5,744,893 A | 4/1998 | Zhao et al. | 310/259 |
| 5,757,100 A | * 5/1998 | Burgbacher | 29/596 |
| 5,773,908 A | * 6/1998 | Stephens et al. | 310/156.47 |
| 5,949,172 A | * 9/1999 | Katagiri | 29/596 |
| 5,998,904 A | 12/1999 | Hattori | 310/216 |
| 6,049,153 A | * 4/2000 | Nishiyama et al. | 310/156.53 |
| 6,072,260 A | 6/2000 | Randall | 310/216 |
| 6,081,058 A | 6/2000 | Suzuki | |
| 6,104,117 A | * 8/2000 | Nakamura et al. | 310/156.45 |
| 6,127,760 A | 10/2000 | Nagasaki | |
| 6,160,330 A | * 12/2000 | Sakamoto | 310/112 |
| 6,169,350 B1 | 1/2001 | Yang | |
| 6,181,047 B1 | 1/2001 | Nitta | 310/254 |
| 6,236,131 B1 | * 5/2001 | Schafer | 310/163 |
| 6,313,558 B1 | * 11/2001 | Abukawa et al. | 310/216 |
| 6,362,553 B1 | * 3/2002 | Nakahara et al. | 310/216 |

* cited by examiner

Primary Examiner—Burton S. Mullins
Assistant Examiner—Heba Y. Elkassabgi
(74) Attorney, Agent, or Firm—J. Gordon Lewis

(57) ABSTRACT

A stator tooth design for a stator core of a permanent magnet motor. The tooth surface comprises a plurality of surface segments, wherein each surface segment of the plurality of surface segments joins an adjacent surface segment of the plurality of surface segments at an obtuse angle, preferably between 160 and 170 degrees. Alternatively, the tooth surface comprises a single essentially straight surface segment. Each of the plurality of surface segments has a starting edge and an ending edge. Preferably, the starting edge of a surface segment lies along a first circumferential path a predetermined radial distance from the outside edge of the stator core and the ending edge of the surface segment lies along a second circumferential path either closer to or further from the outside edge. The first circumferential path and the second circumferential path can be concentric to the outside edge of the stator core.

14 Claims, 3 Drawing Sheets

ROTATING ELECTRIC MACHINE WITH SLOPED TOOTH SURFACES FOR COGGING TORQUE REDUCTION

BACKGROUND OF THE INVENTION

1. Field of the Invention

The invention relates in general to the reduction of cogging torque of permanent magnet motors, and particularly to brushless permanent magnet motors.

2. Description of the Related Art

Permanent magnet motors include a stator core, which is typically made of a stack of thin, metal laminations. The laminations are usually round, with a central opening. The stator core thus is generally cylindrical in shape, with a cavity extending lengthwise about the central axis of the core. In brushless permanent magnet motors, each stator lamination includes radially-extending slot openings, or notches, from the central opening that are aligned when stacked to receive stator windings, or conductors. The stator core surrounds a rotor, typically consisting of a circular steel shaft with a number of permanent magnets fixed around the circumference of the shaft. However, the rotor can also comprise a stack of laminations instead of a solid steel shaft.

In permanent magnet motors, cogging torque is caused by the combination of two factors, the permanent magnet magneto-motive force and the variation of the air gap permeance between the stator and the rotor. Cogging torque is represented by the following formula:

$$T_{cog}\,(\theta_r) = -dW/d\theta_r = -(\tfrac{1}{2})\,(MMF)^2\,(d\lambda/d\theta_r), \text{ wherein}$$

$T_{cog}$ is the cogging torque;
W is the total energy of the field;
$\theta_r$ is the rotor position angle;
MMF is the magnetic excitation of the permanent magnets; and
$\lambda$ is the air gap permeance.

In the design of permanent magnet machines, cogging torque is a concern because it adds unwanted harmonic components to the torque-angle curve, resulting in torque pulsation upon operation of the machine. Although net cogging torque is zero, it causes noise, power losses and inaccuracies, particularly in servo-positioning drives. Thus, reduction of the momentary cogging torque is desirable.

One means disclosed by the prior art to reduce cogging torque is shown in FIG. 8. FIG. 8 is a partial view of a rotor 500 on which a permanent magnet 502 is mounted in the air gap 503. The rotor 500 is surrounded by a stator 504 having a number of stator slot openings 506 forming stator teeth 508. The magnets 502 of the rotor 500 are separated by a width, represented by Ym, while the pitch of the magnets 502 is represented by $\tau_r$. By varying either the magnet shape or the ratio of Ym/$\tau_r$, or both, the designer can adjust the magnetic excitation of the magnets 502, and hence the resultant cogging torque.

Another method to reduce cogging torque is to reduce the variation in air gap permeance by, for example, reducing the width of the stator slot openings 506. However, stator slot openings 506 are restricted in how small they may get. If the openings 506 are too small, insertion of the stator windings is difficult. Due to this limitation, another approach to cogging torque reduction developed, adding notches to the tooth of the stator as shown in FIG. 9. FIG. 9 shows a rotor 500 with magnets 502 surrounded by stator slot openings 506 and a stator tooth 508. The stator tooth 508 has two notches 510. By manipulating the number, width and position of these notches 510, the air gap permeance is modified to reduce cogging torque. However, this approach is vulnerable to excessive saturation of the motor core caused by reduction of the flux path area on the tooth 508 resulting from, for example, paths 512. This saturation results in the reduction of torque linearity within the operating range of the motor. Further, this approach reduces efficiency and torque density as a result of the increase of the effective air gap 503. Thus, it is desired to create a machine design that reduces cogging torque, without the drawbacks of present methods.

SUMMARY OF THE INVENTION

The present invention is a stator tooth for a stator core of a permanent magnet motor, including a stator lamination forming part of a stator core, comprising a first edge formed by a first stator slot opening and extending a first radial distance from an outside edge of the stator core; a second edge formed by a second stator slot opening and extending a second radial distance from the outside edge of the stator core; and a tooth surface extending from an end of the first edge to an end of the second edge, the tooth surface including one of a single essentially straight surface segment and a plurality of surface segments, wherein each surface segment of the plurality of surface segments joins an adjacent surface segment of the plurality of surface segments at an obtuse angle. Preferably, the first radial distance is equal to the second radial distance.

In the aspect where the tooth surface includes a plurality of surface segments, the obtuse angle can be an angle between 120° and 170°. More preferably, the obtuse angle is an angle between 160° and 170°.

The plurality of surface segments can comprise a plurality of planar surface segments. Alternatively, the plurality of surface segments can comprise a plurality of arcuate surface segments.

In another aspect of the invention, each of the plurality of surface segments comprises a starting edge and an ending edge. The starting edge of a surface segment lies along a first circumferential path a predetermined radial distance from the outside edge of the stator core and the ending edge of the surface segment lies along a second circumferential path one of a closer predetermined radial distance from the outside edge of the stator core and a further predetermined radial distance from the outside edge of the stator core. In the preferred design of this aspect, the first circumferential path and the second circumferential path are concentric to the outside edge of the stator core.

In one aspect, the tooth surface comprises at least four surface segments. In one variation of this aspect, each of the at least four surface segments comprises a starting edge and an ending edge; and wherein the starting edge of each surface segment lies along a first circumferential path a first predetermined radial distance from the outside edge of the stator core and the ending edge of each surface segment lies along a second circumferential path one of a closer predetermined radial distance from the outside edge of the stator core than the first predetermined radial distance and a further predetermined radial distance from the outside edge of the stator core than the first predetermined radial distance. In one aspect, the at least four surface segments are four surface segments comprising a first surface segment, a second surface segment, a third surface segment and a fourth surface segment, and an obtuse angle between the first surface segment and the second surface segment is equal to an obtuse angle between the third surface segment and the fourth surface segment. In an alternative aspect, the at least four surface segments are six surface segments comprising a first surface segment, a second surface segment, a third surface segment, a fourth surface segment, and fifth surface segment and a sixth surface segment, and an obtuse angle between the first surface segment and the second surface segment is equal to an obtuse angle between the fifth surface segment and the sixth surface segment and an obtuse angle between the second surface segment and the third surface segment is equal to an obtuse angle between the fourth surface segment and the fifth surface segment.

In another variation of the aspect where the tooth surface comprises at least four surface segments, the at least four surface segments are four surface segments comprising a first surface segment, a second surface segment, a third surface segment and a fourth surface segment, and an obtuse angle between the first surface segment and the second surface segment is equal to an obtuse angle between the third surface segment and the fourth surface segment. Alternatively, the at least four surface segments are six surface segments comprising a first surface segment, a second surface segment, a third surface segment, a fourth surface segment, and fifth surface segment and a sixth surface segment, and an obtuse angle between the first surface segment and the second surface segment is equal to an obtuse angle between the fifth surface segment and the sixth surface segment and an obtuse angle between the second surface segment and the third surface segment is equal to an obtuse angle between the fourth surface segment and the fifth surface segment.

In yet another variation of the aspect where the tooth surface comprises at least four surface segments, each of the at least four surface segments comprises a starting edge and an ending edge, and the starting edge and the ending edge of up to two non-adjacent surface segments of the at least four surface segments lie along a common circumferential path a predetermined radial distance from the outside edge of the stator core. Alternatively, the at least four surface segments are six surface segments; and wherein each of the six surface segments comprises a starting edge and an ending edge; and wherein the starting edge and the ending edge of up to three non-adjacent surface segments of the six surface segments lie along a common circumferential path a predetermined radial distance from the outside edge of the stator core.

In preferred aspects of the invention, a surface area of each surface segment of the plurality of surface segments is equal.

The stator tooth for a stator core of a permanent magnet motor can also comprise a first edge formed by a first stator slot opening and extending a first radial distance from an outside edge of the stator core; a second edge formed by a second stator slot opening and extending a second radial distance from the outside edge of the stator core; and a tooth surface extending from an end of the first edge to an end of the second edge, the tooth surface including a plurality of surface segments, wherein each surface segment of the plurality of surface segments joins an adjacent surface segment of the plurality of surface segments at an obtuse angle.

In another aspect of the invention, the first radial distance is equal to the second radial distance, and a surface area of each of the plurality of surface segments is equal. In this aspect, each of the plurality of surface segments can comprise a starting edge and an ending edge wherein the starting edge of a surface segment lies along a first circumferential path a predetermined radial distance from the outside edge of the stator core and the ending edge of the surface segment lies along a second circumferential path one of a closer predetermined radial distance from the outside edge of the stator core and a further predetermined radial distance from the outside edge of the stator core.

The stator tooth of the present invention effectively reduces cogging torque without significantly increasing the effective air gap or adversely affecting the flux paths of a motor.

BRIEF DESCRIPTION OF THE DRAWING

The various features, advantages and other uses of the present invention will become more apparent by referring to the following detailed description and drawing in which.

DETAILED DESCRIPTION

Figure 1:
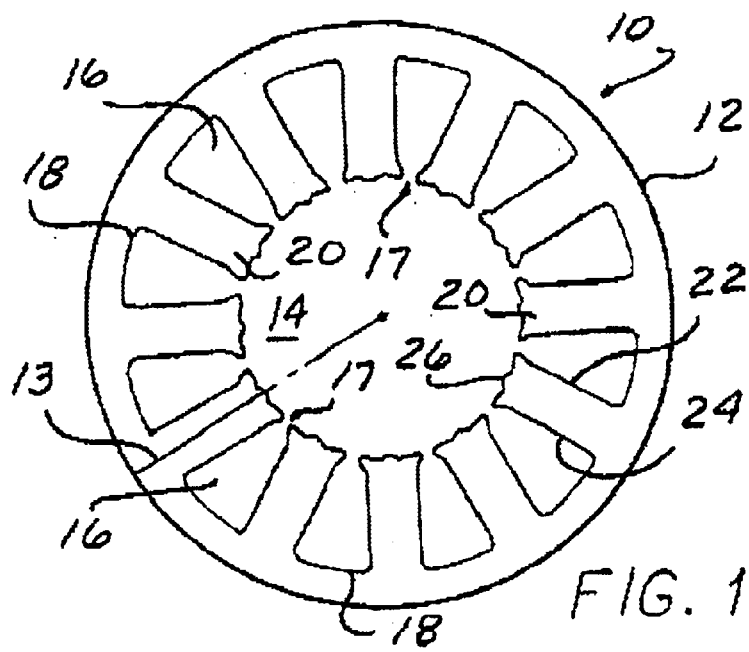
FIG. 1 is a plan view of a stator including stator teeth according to one aspect of the present invention.

The drawing, particularly FIGS. 1–7, show the stator tooth design of the present invention. The present invention reduces cogging torque by modifying the effective air gap permeance through the introduction of unique surface configurations on the stator tooth. The stator 10 (shown without windings) is preferably made of a number of thin, metallic stator laminations, stacked to form a stator core. However, the stator 10 can also include a solid, metallic stator core. Hereinafter, the stator 10 refers to either a solid stator core or one or more stator laminations comprising a stator core. The axial length of a core varies significantly based upon the application, but stator laminations can each be less than 1 mm thick. The stator 10 has a circular outside edge 12 of radius 13 and a central opening 14, which is generally circular. Although not shown, grooves or projections or both are typically formed on the outside edge 12 to enable easier alignment of the stator laminations.

The stator 10 includes a plurality of slot openings 16 arranged around the circumference of the central opening 14. The slot openings 16 extend radially from an opening 17 in the central opening 14 to a slot inside edge 18 a predetermined distance from the outside edge 12 of the stator 10. Adjacent slot openings 16 form a stator tooth 20. Specifically, one slot opening 16 forms one radial edge 22 of the tooth 20, while a second slot opening 16 forms the other radial edge 24 of the tooth 20. In FIG. 1 there are twelve slot openings 16 forming twelve teeth 20 by example only. Each tooth 20 has a tooth surface 26, which is an edge extending between the ends of the radial edges 22, 24. The tooth surfaces 26 shown in FIG. 1 are each made of four surface segments forming a four-edge tooth profile, which will be discussed in further detail hereinafter.

Figure 2:
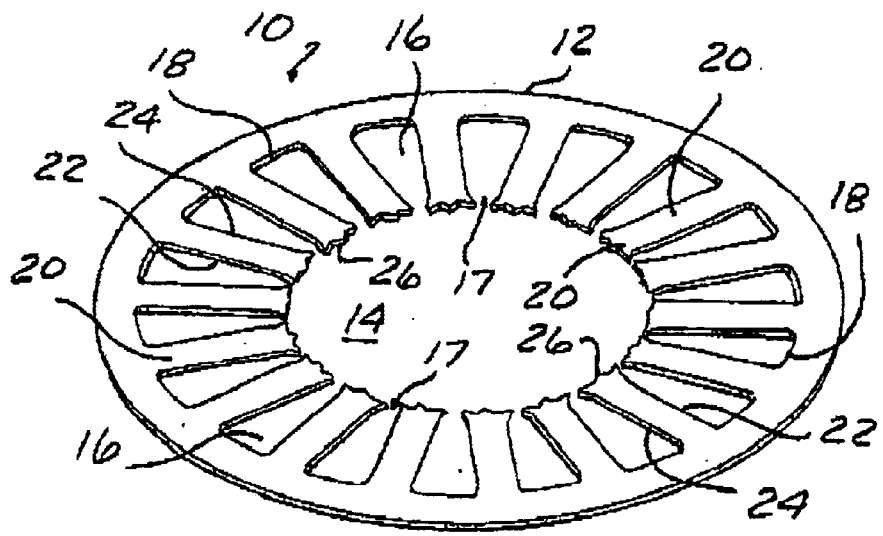
FIG. 2 is a perspective view of a stator lamination according to the aspect of the invention shown in FIG. 1.
Figure 3:
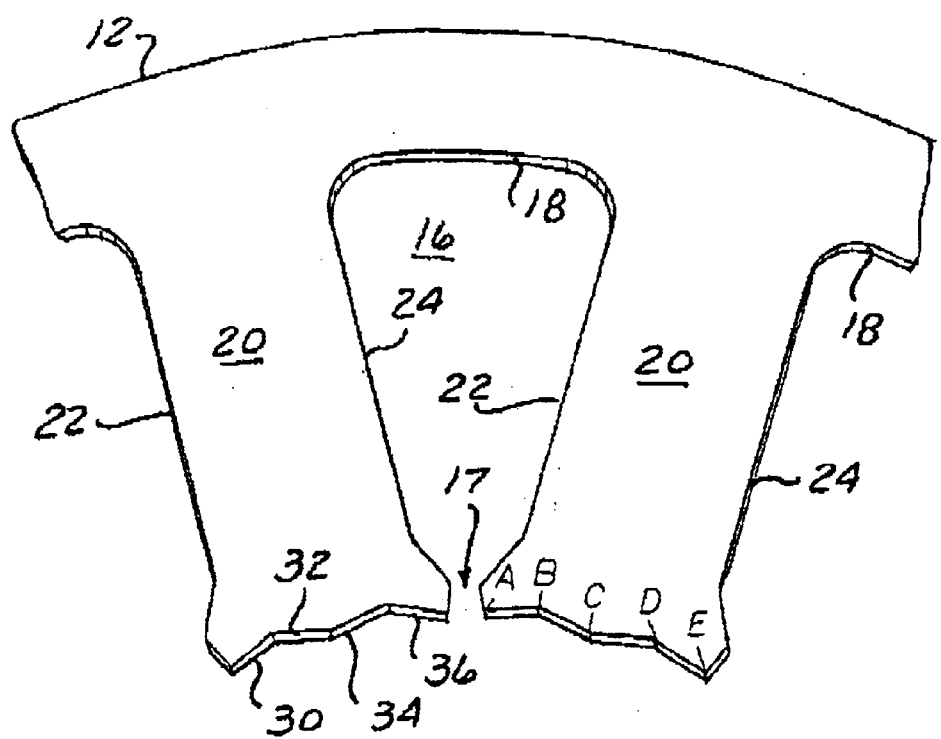
FIG. 3 is a perspective view of two teeth according to the aspect of the invention shown in FIG. 1.

FIGS. 2 and 3 show perspective views of a stator lamination with the same tooth surfaces 26 as shown in FIG. 1. FIG. 2 shows an example with eighteen slot openings 16 forming eighteen teeth 20, each with four surface segments forming a four-edge tooth profile. The slot openings 16 shown are by example only. As one of skill in the art recognizes, the size, shape and number of the slot openings 16 depends upon a variety of factors, including, for example, the number of poles and the size of the windings. Similarly, although the slot openings 16 shown are of the same size and shape, this is not necessary. Thus, each radial edge 22, 24 of each tooth 20 may be different in profile, although in all of the preferred designs each radial edge 22, 24 has the same profile and extends the same distance from the outside edge 12 of the stator 10. As to be discussed hereinafter, the tooth surface 26 is designed to compensate for the cogging torque created by the slot openings 16. Uniformity in size and shape of slot openings 16 and teeth 20 is preferred because such uniformity results in more predictable values for cogging torque and, hence, makes designing the tooth surface 26 to compensate for the cogging torque easier.

FIG. 3 shows two teeth 20, each with a tooth surface 26. Like the radial edges 22, 24, preferably each tooth surface 26 has the same profile as the other tooth surfaces 26, but this is not necessary. Each tooth 20 in FIG. 3 has four surface segments forming a four-edge tooth profile. The four surface segments of the tooth surface 26 are represented as a first surface segment 30, a second surface segment 32, a third surface segment 34 and a fourth surface segment 36. The first surface segment 30 starts at the end of radial edge 22, which is the edge extending longitudinally from point A. An edge extending longitudinally from a point, such as point A, is an edge roughly perpendicular to the top surface of the stator 10 shown in FIG. 1. The first surface segment 30 ends at an edge extending longitudinally from point B. The second surface segment 32 starts at the end of first surface segment 30, i.e., the edge at point B, and ends at an edge extending longitudinally from point C. The third surface segment 34 similarly starts at the edge at point C, the end of the second surface segment 32, and ends at an edge extending longitudinally from point D. Finally, the fourth surface segment 36 starts at the end of the third surface segment, i.e., the edge at point D, and ends at the end of radial edge 24, which is the edge extending longitudinally from point E.

The surface segments 30, 32, 34, 36 are shown as being the same size, as are the other surface segments of other aspects of the present invention discussed hereinafter. This is merely a preferred feature of the invention and is not necessary. Further, although the surface segments are shown as being flat planar areas, this feature is merely preferred for manufacturing simplicity and for easier design of the optimal configuration to counteract the cogging torque, which will be discussed in further detail hereinafter.

Figure 4:
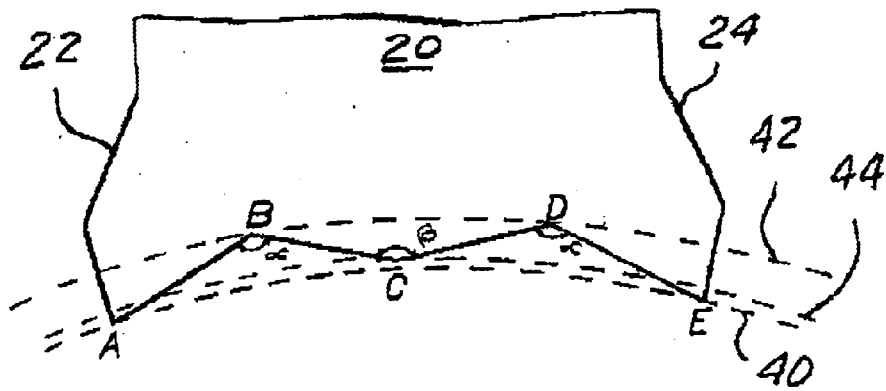
FIG. 4 is a partial plan view of one stator tooth according to the aspect of the invention shown in FIG. 1.

More details of the four-edge tooth 20 aspect of the invention of FIG. 3 are shown in FIG. 4. In the preferred aspect, each surface segment 30, 32, 34, 36 starts and ends on a circumferential path of alternating smaller and larger radii. Preferably, but not necessarily, the paths are concentric to the outside edge 12 of the stator 10. Specifically, the first surface segment 30 starts at point A located along the circumferential path 40, which extends a predetermined distance from the outside edge 12 of the stator 10. Point B, where the first surface segment 30 ends and the second surface segment 32 begins, is on a circumferential path 42, which extends a shorter predetermined distance from the outside edge 12 of the stator and thus has a larger radius than the path 40. The second surface segment 32 ends, and the third surface segment 34 begins at point C, which is located along the circumferential path 44. The path 44 extends a predetermined distance from the outside edge 12 of the stator 10 such that the radius of the path 44 is smaller than the radius of the path 42. As shown in FIG. 4, the path 44 has a larger radius than the path 40; however, the path 44 can have the same radius as the path 40, or a smaller radius than the path 40.

Point D, as mentioned, is the start of the fourth edge segment 36 and the end of the third surface segment 34. Point D is located along the circumferential path 42, which is the same path 42 on which point B is located. This is a preferred design for a four-edge tooth surface 26 profile, but the circumferential path can be located on any circumferential path closer to the outside edge 12 of the stator 10 than the path 44 resulting in a radius of the circumferential path for point D larger than that of path 44. Alternating the width of the circumferential paths, the end of the fourth surface segment 36 occurs at point E, which is located on a path of a smaller radius than path 42. Here, the preferred aspect is shown wherein point E is located along the circumferential path 40, which is the same path 40 on which point A is located. The distance of the circumferential paths 40, 42, 44 from the outside edge 12 of the stator 10 will be discussed hereinafter with the discussion of the angles a, and β.

As presented in FIG. 4, the surface segments 30, 32, 34 and 36 are seen in profile as line segments joining at sharp corners forming precise angles α and β. Such precision is difficult in the manufacturing of a stator 10, whether solid or comprised of laminations. Two common methods of manufacture include pouring liquid metal into a mold to make a solid stator, and stamping thin sheets of metal to make stator laminations. Neither typically results in perfect edges with sharp corns without additional machining. Thus, the present invention contemplates that the segments of the tooth 20 can be joined by, for example, arcs roughly tangential to the circumferential paths, such as paths 40, 42, 44 previously described. Similarly, the connection of the radial edges 22, 24 to the tooth surface 26 may also not be sharp edges, but instead be somewhat rounded. Further, due to manufacturing difficulties, where starting or ending points of surface segments are described as being on the same circumferential path, such as points A and E located on path 40 as described above, the points and the edges extending longitudinally from them are not necessarily at the exact same distance from the edge 12 of the stator 10, but instead are only roughly located along the same path, which means that the points and edges are along the same circumferential path within manufacturing tolerances.

As mentioned and as shown in FIG. 4 and later in FIGS. 5–7, in profile the surface segments, such as surface segments 30, 32, 34 and 36, are straight line segments. This is true in the preferred aspect of the invention where the surface segments form planar regions. Of course, as discussed with respect to the edges joining the surface segments, it is contemplated that manufacturing tolerances will result in less precise shapes that roughly conform to the desired design. This is also true for other aspects of the invention, where the surface segments do not form planar regions. Specifically, another aspect of the invention contemplates that each surface segment, such as surface segments 30, 32, 34 and 36, curves from its starting edge to its ending edge. Preferably, the curve is a shallow curve that minimizes changes in the effective air gap resulting from the tooth surface 26.

Figure 5:
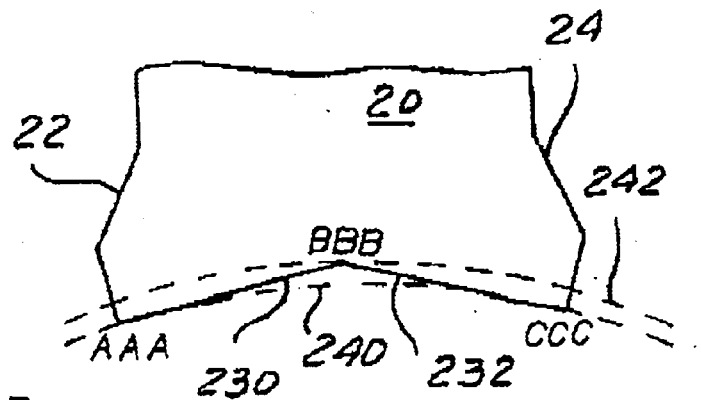
FIG. 5 is a partial plan view of another stator tooth according to the present invention.

FIG. 5 shows another aspect of the present invention, a two-edge tooth surface 26 profile. This aspect has only two surface segments, first surface segment 230 connected to the radial edge 22 at an edge extending longitudinally from point AAA, and second surface segment 232 connected to the radial edge 24 at an edge extending longitudinally from point CCC. The first surface segment 230 and the second surface segment 232 are connected at an edge extending longitudinally from point BBB. Again, each surface segment 230, 232 starts and ends at points located on alternating smaller and larger diameter circumferential paths, preferably, but not necessarily, concentric to the outside edge 12 of the stator 10. Thus, as shown in the example, points AAA and CCC are on a circumferential path 240 further away from the outside edge 12 of the stator than point BBB on circumferential path 242. Of course, the circumferential path 242 could have a smaller radius than the circumferential path 240, but this is a less desirable configuration for the tooth surface 26. As mentioned, the distance of the circumferential paths, like paths 240 and 242, from the outside edge 12 of the stator 10 will be discussed hereinafter.

Figure 6:
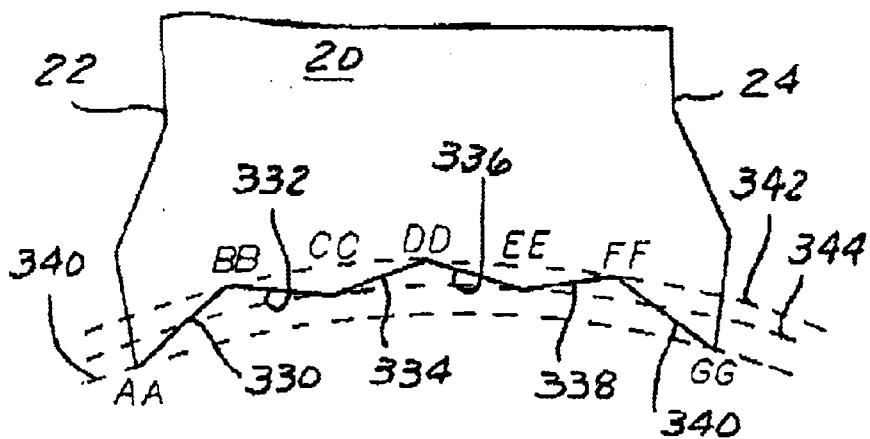
FIG. 6 is a partial plan view of another stator tooth according to the present invention.
Figure 7:
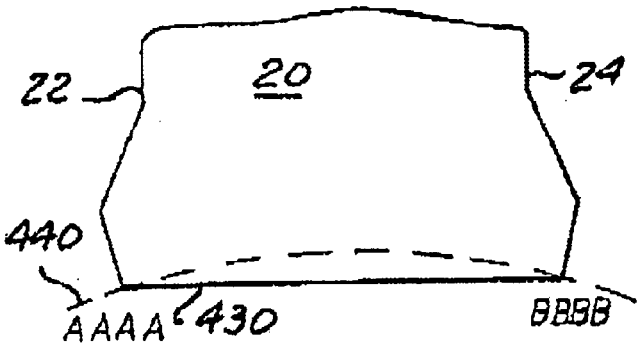
FIG. 7 is a partial plan view of another stator tooth according to the present invention.
Figure 8:
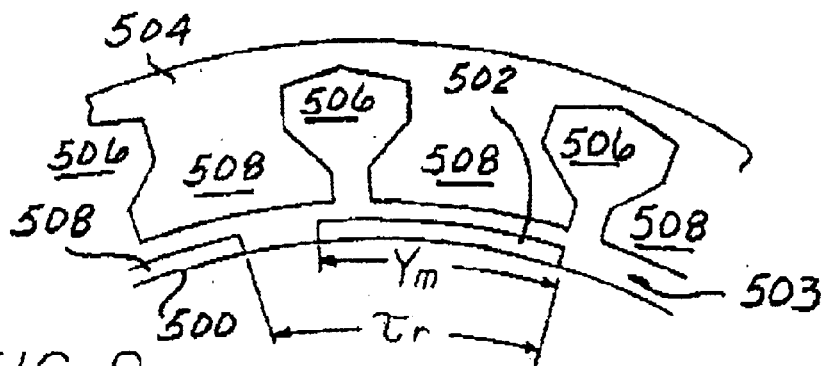
FIG. 8 is a partial plan view of a prior art stator, rotor and permanent magnet.
Figure 9:
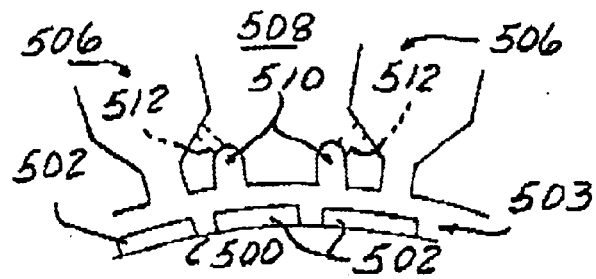
FIG. 9 is a partial plan view of a prior art stator tooth and a rotor.

A preferred aspect of a six-edge tooth surface 26 profile is shown in FIG. 6. The tooth surface 26 has six surface segments 330, 332, 334, 336, 338, 339. The first surface segment 330 starts at an edge longitudinally extending from point AA, located along the circumferential path 340. The path 340 extends a predetermined distance from the outside edge 12 of the stator 10. Point BB, which marks the edge where the first surface segment 330 ends and the second surface segment 332 begins, is on a circumferential path 342. The path 342 preferably extends a shorter predetermined distance from the outside edge 12 of the stator 10 than the path 340, and thus has a larger radius than the path 340. The second surface segment 332 ends and the third surface segment 334 begins at the edge longitudinally extending from point CC, which point is located along a circumferential path 344. The path 344 extends a predetermined distance from the outside edge 12 of the stator 10 such that the radius of the path 344 is smaller than the radius of the path 342. As shown in FIG. 4, the path 344 has a larger radius than the path 340; however, the path 44 can have the same radius as the path 340, or a smaller radius than the path 340.

The edge marked by point DD is the start of the fourth surface segment 336 and the end of the third surface segment 334, and point DD is located along the circumferential path 342, which is the same path 342 on which point BB is located. This is a preferred design, but the circumferential path can be located on any circumferential path closer to the outside edge 12 of the stator 10 than the path 344. Thus, the radius of the circumferential path on which point DD is located is of a larger radius than path 344. Alternating the radius of the circumferential paths, the end of the fourth surface segment 336 and the beginning of the fifth surface segment 338 occurs at the edge represented by point EE, which is located on a path of a smaller radius than path 342. Here, the preferred aspect is shown wherein point EE is located along the circumferential path 344, which is the same path 344 on which point CC is located. Point FF represents the edge that ends the fifth surface segment 338 and begins the sixth surface segment 340. Point FF is preferably located along the circumferential path 342 that points BB and DD are located. However, the path on which point FF is located can be any path having a larger radius than the path 344 on which point EE is located. The sixth surface segment 340 joins the radial edge 24 at an edge longitudinally extending from the point GG. Point GG is located on a circumferential path a predetermined distance from the outside edge 12 of the stator 10 such that the radius of the path is smaller than the radius of the path 344. Preferably, point GG is on the path 340 on which point AA is located. Again, the distance of the circumferential paths from the outside edge 12 of the stator 10 will be discussed hereinafter.

The number, position and slope of the tooth surfaces 26 are intended to offset the cogging torque inevitably caused by the slot openings 17. The distance of the circumferential paths from the outside edge 12 of the stator 10, and thus the starting and ending points and the slope of the surface segments, are designed so that each surface segment, unlike the classical notched-tooth geometry previously described, has a reasonable impact on cogging torque by changing the profile of the air gap permeance throughout the entire surface of the air gap. In order to compensate for the stator openings 16 without significantly reducing the flux path or increasing the effective air gap, the circumferential paths are preferably close together, resulting in shallow, wave-like tooth surfaces 26. More specifically, the circumferential paths are arranged so that the angle between each pair of surface segments is an obtuse angle, that is, an angle greater than 90°, but less than 180°. Preferably, the obtuse angle between each surface segment is a large obtuse angle, i.e., an angle over 120°, and preferably between 160° and 170°.

Referring back to FIGS. 3 and 4, the angles $\alpha$, $\beta$ between each pair of surface segments 30, 32, 34, 36 are more clearly seen. The surface segment 30 extends to surface segment 32, defining an obtuse angle a where they join at point B. The surface segment 32 extends to surface segment 34, defining a second obtuse angle P where they join at point C. Finally, the surface segment 34 extends to the surface segment 36. Because the surface segments 34 and 36 are mirror images of the surface segments 30 and 32, they also define the same obtuse angle a where they join at point D. Where the surface segments are actuate, or curve, from their starting edge to their ending edge in an alternative aspect of the invention, imaginary lines extending from the points where each of the pair of surface segments start and end intersect to similarly define the obtuse angle between each pair of surface segments.

While the aspects of the invention previously described show each surface segment, such as surface segments 30, 32, 34, 36, starting and ending on alternating smaller and larger diameter circumferential paths, it is clear from the foregoing description of the angles between each pair of surface segments that a particular surface segment can start and end on the same circumferential path. In preferred designs where each of the radial edges 22 and 24 extend the same radial distance from the outside edge 12 of the stator 10, such a segment can be incorporated into tooth surfaces 26 of three or more surface segments. However, these surface segments starting and ending on the same path are not preferred except in the aspect of the invention where only one surface segment 430 exists, as shown in FIG. 7. In the aspect of the invention shown in FIG. 7, the surface segment 430 starts at the end of the radial edge 22 at the edge longitudinally extending from the point AAAA. The surface segment 430 extends to the end of the radial edge 24 at the edge longitudinally extending from the point BBBB. The points AAAA and BBBB are located along the same circumferential path 430, and the surface segment 430 is a line segment tangential to the outside edge 12 of the stator 10. In this aspect of the invention, a curved surface segment is not preferred because the resultance change in air gap permeance from such a surface is generally insufficient to produce a significant change in cogging torque.

As mentioned, the number, position and slope of the tooth surfaces 26 are intended to offset the cogging torque inevitably caused by the slot opening. Thus, variables of the motor topology, such as the width and pitch of the magnets, the number of poles, the width of the stator slot openings 17 and the number of stator slot openings 17, among other variables, affect the desired design of the present invention in applications. Because of the wide variety of competing design elements, more than one stator 10 may effectively reduce the cogging torque of a motor. For example, in an eight pole, twelve slot motor design, the stator 10 of FIG. 1 has been shown to effectively offset cogging torque. The six-edge stator tooth surface 26 design of FIG. 6 has also been shown to be effective in such a motor design. Further, it follows that one particular stator 10 may work well for any number of motor designs. For example, the stator 10 of FIG. 1 has also been shown to effectively offset cogging torque in a six pole, eighteen slot design.

Thus is presented a unique stator design that effectively reduces cogging torque that can be implemented in any number of motor designs.

What is claimed is:

1. A stator tooth for a stator core of a permanent magnet motor comprising:
   a first edge formed by a first stator slot opening and extending a first radial distance from an outside edge of the stator core;
   a second edge formed by a second stator slot opening and extending a second radial distance from the outside edge of the stator core; and
   a tooth surface extending from an end of the first edge to an end of the second edge, the tooth 5 including a plurality of surface segments, wherein each surface segment of the plurality of surface segments joins an adjacent surface segment of the plurality of surface segments at an obtuse angle and including a starting edge and an ending edge, the starting edge and the ending edge disposed at substantially the same radial distance from the outside edge of the stator core.

2. The stator tooth of claim 1 wherein each surface segment joins an adjacent surface segment at an angle between 120° and 170°.

3. The stator tooth of claim 1 wherein each surface segment joins an adjacent surface segment at an angle between 160° and 170°.

4. The stator tooth of claim 1 wherein the plurality of surface segments comprise a plurality of planar surface segments.

5. The stator tooth of claim 1 wherein the plurality of surface segments comprise a plurality of arcuate surface segments.

6. The stator tooth of claim 1 wherein starting edge and the ending edge extend to points lying along a first circumferential path and at least one of the plurality of surface segments joins a respective adjacent surface segment at a point lying along a second circumferential path one of a closer predetermined radial distance from the outside edge of the stator core and a further predetermined radial distance from the outside edge of the stator core, and wherein the first circumferential path and the second circumferential path are concentric to the outside edge of the stator core.

7. The stator tooth of claim 1 wherein the tooth comprises at least four surface segments.

8. The stator tooth of claim 7 wherein the at least four surface segments include a first surface segment, a second surface segment, a third surface segment and a fourth surface segment, wherein an angle between the first surface segment and the second surface segment is equal to an angle between the third surface segment and the fourth surface segment.

9. The stator tooth of claim 7 wherein the at least four surface segments are four surface segments comprising a fist surface segment, a second surface segment, a third surface segment and a fourth surface segment; and wherein an obtuse angle between the first surface segment and the second surface segment is equal to an obtuse angle between the third surface segment and the fourth surface segment.

10. The stator tooth of claim 7 wherein each of the at least four surface segments comprises a starting edge and an ending edge; and wherein the starting edge and the ending edge of up to two non-adjacent surface segments of the at least four surface segments lie along a common circumferential path a predetermined radial distance from the outside edge of the stator core.

11. The stator tooth of claim 1 wherein a surface area of each surface segment of the plurality of surface segments is equal.

12. A stator tooth for a stator core of a permanent motor comprising:
   a first edge formed by a first stator slot opening and extending a first radial distance from an outside edge of the stator core;
   a second edge formed by a second stator slot opening and extending a second radial distance from the outside edge of the stator core; and
   a tooth surface extending from an end of the first edge to an end of the second edge, the tooth surface including a plurality of surface segments, wherein each surface segment of the plurality of surface segments joins an adjacent surface segment of the plurality of surface segments at an obtuse angle and including a starting edge and an ending edge, the starting edge and ending edge disposed at substantially the same radial distance from the outside edge of the stator core; and wherein the tooth surface comprises at least four surface segments; and
wherein each of the at least four surface segments comprises a starting edge and an ending edge; and wherein the starting edge of each surface segment lies along a first circumferential path a first predetermined radial distance from the outside edge of the stator core and the ending edge of each surface segment lies along a second circumferential path one of a closer predetermined radial distance from the outside edge of the stator core than the first predetermined radial distance and a further predetermined radial distance from the outside edge of the stator core than the first predetermined radial distance.

13. A stator tooth for a stator core of a permanent magnet motor comprising:
   a first edge formed by a first stator slot opening and extending a first radial distance from an outside edge of the stator core;
   a second edge formed by a second stator slot opening and extending a second radial distance from the outside edge of the stator core; and
   a tooth surface extending from an end of the first edge to an end of the second edge, the tooth surface including a plurality of surface segments, wherein each surface segment of the plurality of surface segments joins an adjacent surface segment of the plurality of surface segments at an obtuse angle and including a starting edge and an ending edge, the starting edge and the ending edge disposed at substantially the same radial distance from the outside edge of the stator core; and wherein the tooth surface further comprises at least six surface segments including a first surface segment, a second surface segment, a third surface segment, a fourth surface segment, and fifth surface segment and a sixth surface segment, wherein an angle between the first surface segment and the second surface segment is equal to an angle between the fifth surface segment and the sixth surface segment and an angle between the second surface segment and the third surface segment is equal to an angle between the fourth surface segment and the fifth surface segment.

14. The stator tooth of claim 13 wherein each of the at least six surface segments further comprises a starting edge and an ending edge and wherein the starting edge and the ending edge of up to three non-adjacent surface segments lie along a common circumferential path a predetermined radial distance from the outside edge of the stator core.

* * * * *